(12) United States Patent
Griffin et al.

(10) Patent No.: US 8,452,965 B1
(45) Date of Patent: May 28, 2013

(54) SELF-IDENTIFICATION OF TOKENS

(75) Inventors: Robert W. Griffin, Hollis, NH (US);
Daniel V. Bailey, Pepperell, MA (US);
Joshua A. Rosenthol, Centreville, VA (US)

(73) Assignee: EMC Corporation, Hopkinton, MA (US)

( * ) Notice: Subject to any disclaimer, the term of this patent is extended or adjusted under 35 U.S.C. 154(b) by 288 days.

(21) Appl. No.: 12/826,466

(22) Filed: Jun. 29, 2010

(51) Int. Cl.
*G06F 21/00* (2006.01)
(52) U.S. Cl.
USPC .................. 713/172; 713/159; 726/9; 726/20
(58) Field of Classification Search
None
See application file for complete search history.

(56) References Cited

U.S. PATENT DOCUMENTS

| | | | |
|---|---|---|---|
| 6,154,879 A * | 11/2000 | Pare et al. | 705/35 |
| 7,069,439 B1 * | 6/2006 | Chen et al. | 713/172 |
| 2004/0255143 A1 * | 12/2004 | Wemyss et al. | 713/200 |
| 2006/0059548 A1 * | 3/2006 | Hildre et al. | 726/9 |
| 2006/0234678 A1 * | 10/2006 | Juitt et al. | 455/411 |
| 2006/0271730 A1 * | 11/2006 | Ambilkar et al. | 711/104 |
| 2007/0162890 A1 * | 7/2007 | Meier et al. | 717/100 |
| 2008/0082837 A1 * | 4/2008 | Mattsson | 713/193 |
| 2008/0183488 A1 * | 7/2008 | Vianello | 705/1 |
| 2009/0022374 A1 * | 1/2009 | Boult | 382/119 |
| 2009/0199004 A1 * | 8/2009 | Krawczewicz et al. | 713/172 |
| 2009/0287837 A1 * | 11/2009 | Felsher | 709/229 |
| 2010/0257612 A1 | 10/2010 | McGuire et al. | |
| 2012/0173563 A1 * | 7/2012 | Griffin et al. | 707/769 |

FOREIGN PATENT DOCUMENTS

| | | | |
|---|---|---|---|
| EP | 1906336 A2 * | 4/2008 | |
| WO | WO 2010/057546 A1 * | 5/2010 | |

\* cited by examiner

*Primary Examiner* — Hadi Armouche
(74) *Attorney, Agent, or Firm* — BainwoodHuang (57) ABSTRACT

A technique of protecting a datum within a set of sensitive data is presented. In this technique, the datum includes a first set of bits satisfying a first set of constraints, and a computer receives the set of sensitive data from an authorized client. The technique involves producing a token corresponding to the datum, the token including a second set of bits distinct from the first set of bits, the second set of bits satisfying a second set of constraints, the second set of constraints being a superset of the first set of constraints. The technique further involves storing the datum and the corresponding token. The technique further involves sending the token to the authorized client, the authorized client enabled to perform, using the second set of bits, a verification that the token satisfies the second set of constraints, the verification being performed apart from the database.

8 Claims, 6 Drawing Sheets

SELF-IDENTIFICATION OF TOKENS

BACKGROUND

Tokenization technology aims to mask sensitive data like credit card and Social Security numbers. Existing systems that process data matching a particular format sometimes need to be prohibited from accessing the actual data. The data itself is replaced with a "token" that appears to be correctly formatted data, such as having a correct check digit. Based on the token value, a properly authorized system can look up the actual data.

In general, untrusted systems operate only on tokens. Trusted systems that are authorized to view genuine data may submit a token to a Tokenization Server. After checking credentials, the Tokenization Server returns the genuine data to the trusted system.

SUMMARY

In the current tokenization architecture, one can see the performance bottleneck imposed by the Tokenization Server. In a complex organization like a payment processor, for example, many systems may need access to data. It is therefore inefficient to require the Tokenization Server to service all data-related requests.

In contrast to the above-described system in which the Tokenization Server services all data-related requests, a technique of protecting a datum within a set of sensitive data is presented as an embodiment of a solution to the problem of distributing at least some of the data-related requests to the other systems while maintaining the same level of security as the traditional tokenization architecture. In this technique, the datum includes a first set of bits satisfying a first set of constraints, and a computer receives the set of sensitive data from an authorized client. The technique involves producing, by the computer upon receipt of a tokenization request, a token corresponding to the datum, the token including a second set of bits distinct from the first set of bits, the second set of bits satisfying a second set of constraints, the second set of constraints being a superset of the first set of constraints. The technique further involves storing, by the computer in a database entry on a database, the datum and the corresponding token. The technique further involves sending, by the computer, the token to the authorized client, the authorized client enabled to perform, using the second set of bits, a verification that the token satisfies the second set of constraints, the verification being performed apart from the database.

Implementations are directed to the following.

Producing the token can include allocating, according to an externally defined padding value, bits from the second set of bits to form a set of hold bits. In this case, producing the token can further include setting values of the bits in the set of hold bits according to values of the bits in the first set of bits.

Producing the token can also include allocating bits from the second set of bits to form a set of check bits. In this case, producing the token can further include adjusting values of the bits in the set of check bits and verifying that the second set of bits satisfies the first set of constraints.

Producing the token can also include allocating bits from the second set of bits to form a set of codeword bits and allocating bits from the set of codeword bits for a set of index bits and a set of message authentication code (MAC) bits. In this case, producing the token can further include mapping at least a subset of the set of index bits to a pointer to the address belonging to the database entry, applying a keyed hash function to the set of index bits, a value of the keyed hash function specified by a cryptographic key and a set of index bits, and setting values of the bits in the set of MAC bits according to the value of the keyed hash function. Further, allocating bits from the set of codeword bits can include subdividing the set of codeword bits into a set of index bits and a set of MAC bits according to a set of control bits, wherein the set of control bits varies according to values of the bits in the first set of bits. Further, enabling the client to perform the verification that the second set of bits satisfies the second set of constraints can include sending the cryptographic key to the authorized client and sending the set of control bits to the authorized client. In this case, the method can further include receiving, at the computer, a suspected token from the authorized client, the suspected token having a suspected index, verifying, at the database, whether the suspected index points to a database entry and, if the suspected index points to a database entry, whether the token in the database entry matches the suspected token, and notifying the authorized client whether the suspected token is a token stored in the database.

A further embodiment to the stated problem is a system configured to protect a datum within a set of sensitive data, the datum including a first set of bits satisfying a first set of constraints. The system comprises a database, a network interface, and a processor. Upon receiving a datum from an authorized client at the network interface, the datum being from the set of sensitive data and a tokenization request from the authorized client, the processor is configured to produce a token corresponding to the datum, the token including a second set of bits distinct from the first set of bits, the second set of bits satisfying a second set of constraints, the second set of constraints being a superset of the first set of constraints. The processor is then further configured to store the datum and the corresponding token in a database entry on the database, the database entry having an address within the database. The processor is then further configured to send the token to the authorized client, the authorized client enabled to perform, using the second set of bits, a verification that the token satisfies the second set of constraints, the verification being performed apart from the database.

Implementations are directed to the following.

Producing the token can include allocating, according to an externally defined padding value, bits from the second set of bits to form a set of hold bits. In this case, producing the token can further include setting values of the bits in the set of hold bits according to values of the bits in the first set of bits.

Producing the token can also include allocating bits from the second set of bits to form a set of check bits. In this case, producing the token can further include adjusting values of the bits in the set of check bits and verifying that the second set of bits satisfies the first set of constraints.

Producing the token can also include allocating bits from the second set of bits to form a set of codeword bits and allocating bits from the set of codeword bits for a set of index bits and a set of message authentication code (MAC) bits. In this case, producing the token can further include mapping at least a subset of the set of index bits to a pointer to the address belonging to the database entry, applying a keyed hash function to the set of index bits, a value of the keyed hash function specified by a cryptographic key and a set of index bits, and setting values of the bits in the set of MAC bits according to the value of the keyed hash function. Further, allocating bits from the set of codeword bits can include subdividing the set of codeword bits into a set of index bits and a set of MAC bits according to a set of control bits, wherein the set of control bits varies according to values of the bits in the first set of bits. Further, enabling the client to perform the verification that the second set of bits satisfies the second set of constraints can include sending the cryptographic key to the authorized client and sending the set of control bits to the authorized client. In this case, the processor can then be further configured to receive, at the computer, a suspected token from the authorized client, the suspected token having a suspected index, verifying, at the database, whether the suspected index points to a database entry and, if the suspected index points to a database entry, whether the token in the database entry matches the suspected token, and notifying the authorized client whether the suspected token is a token stored in the database.

A further embodiment to the stated problem is a computer program product which includes a non-transitory computer readable storage medium storing code, when executed by a computer, causes the computer, upon receiving a set of sensitive data and a tokenization request from an authorized client, to protect a datum within a set of sensitive data, the datum including a first set of bits satisfying a first set of constraints. The code comprises instructions to produce a token corresponding to the datum, the token including a second set of bits distinct from the first set of bits, the second set of bits satisfying a second set of constraints, the second set of constraints being a superset of the first set of constraints. The code further comprises instructions to store the datum and the corresponding token in a database entry on a database, the database entry having an address within the database. The code further comprises instructions to send the token to the authorized client, the authorized client enabled to perform, using the second set of bits, a verification that the token satisfies the second set of constraints, the verification being performed apart from the database.

Implementations are directed to the following.

Producing the token can include allocating, according to an externally defined padding value, bits from the second set of bits to form a set of hold bits. In this case, producing the token can further include setting values of the bits in the set of hold bits according to values of the bits in the first set of bits.

Producing the token can also include allocating bits from the second set of bits to form a set of check bits. In this case, producing the token can further include adjusting values of the bits in the set of check bits and verifying that the second set of bits satisfies the first set of constraints.

Producing the token can also include allocating bits from the second set of bits to form a set of codeword bits and allocating bits from the set of codeword bits for a set of index bits and a set of message authentication code (MAC) bits. In this case, producing the token can further include mapping at least a subset of the set of index bits to a pointer to the address belonging to the database entry, applying a keyed hash function to the set of index bits, a value of the keyed hash function specified by a cryptographic key and a set of index bits, and setting values of the bits in the set of MAC bits according to the value of the keyed hash function. Further, allocating bits from the set of codeword bits can include subdividing the set of codeword bits into a set of index bits and a set of MAC bits according to a set of control bits, wherein the set of control bits varies according to values of the bits in the first set of bits. Further, enabling the client to perform the verification that the second set of bits satisfies the second set of constraints can include sending the cryptographic key to the authorized client and sending the set of control bits to the authorized client. In this case, the code can further comprise instructions to receive, at the computer, a suspected token from the authorized client, the suspected token having a suspected index, verifying, at the database, whether the suspected index points to a database entry and, if the suspected index points to a database entry, whether the token in the database entry matches the suspected token, and notifying the authorized client whether the suspected token is a token stored in the database.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of protecting a datum within a set of sensitive data reduces an amount of data-related requests serviced by a Tokenization Server by allowing a client system to determine whether a given initial value represents sensitive data [e.g., credit card numbers or other personally identifiable information (PII)] or a token. The improved technique reduces the amount of workload on the Tokenization Server while maintaining the same level of security as traditional tokenization architecture.

Figure 1:
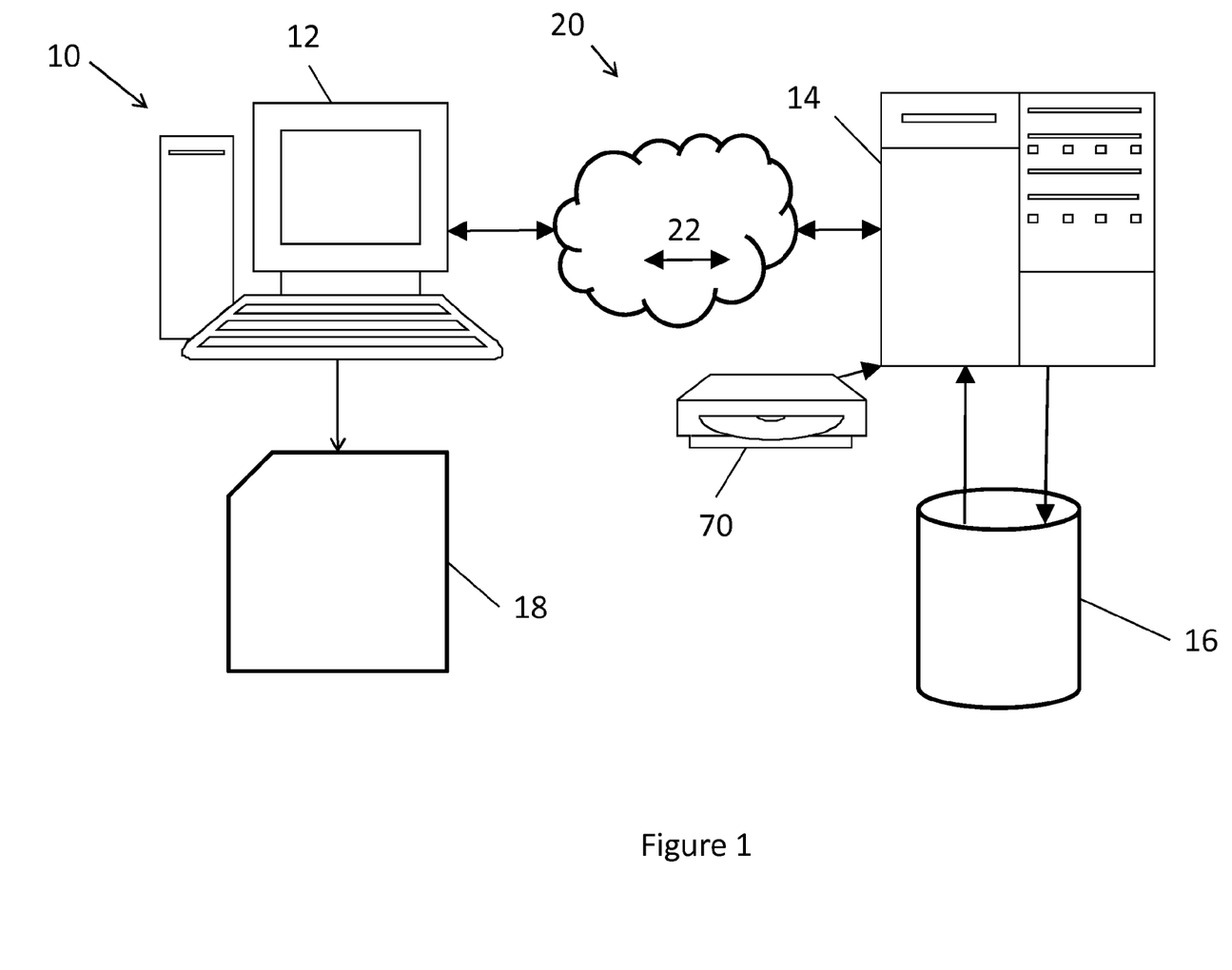
FIG. 1 is a block diagram of an electronic system configured to implement an improved technique of securing sensitive data.

FIG. 1 shows an electronic environment 10 which is suitable for use by the improved technique. The electronic environment includes a client 12, a Tokenization Server 14, a database 16, and a communications medium 20. Client 12 is connected to Tokenization server 14 through communications medium 20.

Communications medium 20 conveys electronic communications 22 between the components of electronic environment 10. Communications medium 20 is illustrated as a cloud because it is capable of having a variety of topologies including hub-and-spoke, backbone, loop, irregular, a combination of the Internet and LAN(s), combinations thereof, and so on.

Communications medium 20 can have insecure lines, where electronic communications 22 may be viewed, intercepted, and/or altered by a hostile party, and secure lines, where electronic communications 22 may not be intercepted or altered by a hostile party. In cases where a secure line has far less bandwidth than an insecure line, most electronic communications 22 passing through communications medium 20 would take place over the insecure lines.

Client 12 is a computer system, each computer in the computer system having a processor and non-volatile storage, accessed by an authorized user. Client 12 includes, for example, a data loss prevention (DLP) system. Such a system may be standalone or embedded within, e.g., a point-of-sale (POS) system. For example, at a POS system, an initial value (IV) is produced by, e.g., swiping a credit card. In such a case, the IV takes the form of 16-digit credit card number. For practical, e.g., risk mitigation, reasons, client 12 is not to be in possession of, or have direct access to, the set of initial values. For example, client 12 can store a set of credit card numbers taken throughout a single day, and then send the set of credit card numbers to a safe location at the end of the day, along with a request for tokens for each of the credit card numbers in the set.

Tokenization Server 14 includes a network interface configured to receive electronic communications 22 from client 12 over communications medium 20. Tokenization Server 14 further includes a processor configured to produce tokens. Tokens are produced, for example, from a computer program product executed by the processor on Tokenization Server 14. Tokenization Server 14 is further configured to receive, e.g., over communications medium 20, external data configured to define characteristics of tokens produced by the processor.

Database 16 is connected to Tokenization Server 14 and includes a non-volatile storage medium configured to store database entries. Access to database entries within database 16 is controlled by, e.g., Tokenization Server 14. Database 16 provides a secure location for an initial value. For example, client 12 may access an initial value from database 16 upon a presentation of proper credentials, e.g. presentation of a correct address and token combination.

Figure 2:
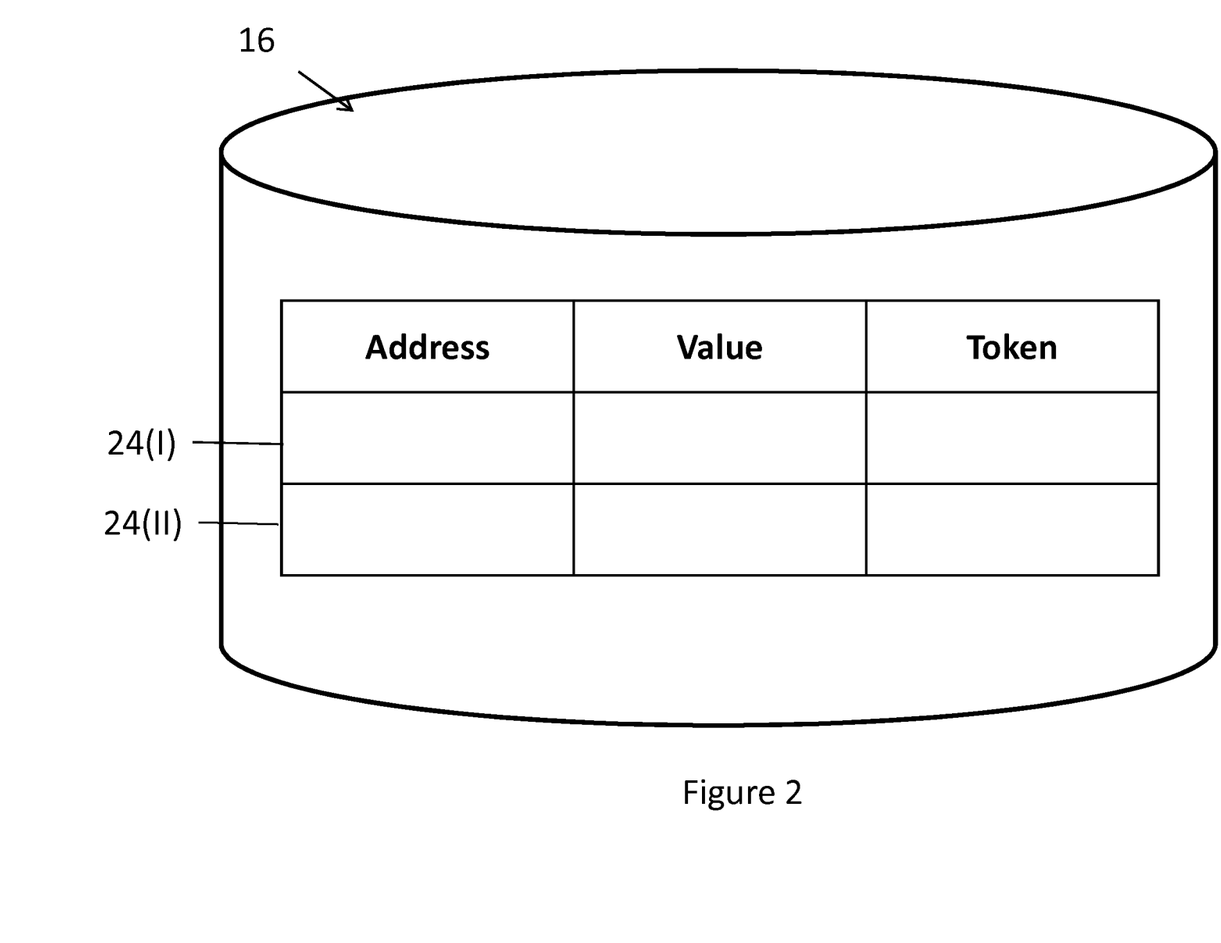
FIG. 2 is a block diagram of database entries on a database in the electronic system of FIG. 1.

FIG. 2 illustrates a sample of database entries within database 16. Each database entry 24(I), 24(II), . . . (i.e., database entries 24) includes an initial value (e.g., a credit card number) and a token. Database entries 24 can also include an address. A lookup operation can then reference database entry 24 by matching, e.g., a pointer to the address.

During operation, client 12 (FIG. 1) sends an initial value and a request for a token in exchange for the initial value to Tokenization Server 14 over communications medium 20. Once the request for a token is received and verified at Tokenization Server 14, the processor in Tokenization Server 14 takes in the initial value received with the request and produces a token corresponding to the initial value. The token and corresponding initial value are also stored within a database entry in database 16. The token, without the initial value, is sent back to the client.

The sending of the initial value can include encoding the initial value in a cryptographic schema, such as an asymmetric public/private key cryptographic schema. If the encoded initial value is sent over an insecure line in communications medium 20, then there must be a scheme to ensure that the initial value is the one sent by client 12. To wit, initial values used in a transaction need to satisfy some constraint so that a user or system handling the transaction can be reasonably sure that the initial value is not fraudulent or simply contains an error. For example, credit card numbers typically contain a check digit computed using the Luhn algorithm. That is, a credit card number, when subjected to the Luhn algorithm, needs to be, e.g., congruent modulo some prespecified number. A number resembling a credit card number that did not satisfy such a congruence upon application of the Luhn algorithm would be identified as an invalid number, and the request for a token would be rejected. The sending of the request can also include a similar encoding of the request. In this case, a tampered request would most likely be nonsense once decoded.

Here, the token includes a set of bits distinct from the set of bits included in its corresponding initial value. On the other hand, for the purpose of enhancing security, for example, the token and the initial value have the same number of bits. When the token and the initial value have the same number of bits, it is difficult for anyone accessing data on client 12 to determine whether the data is a token or an initial value. For example, one could run data through a test such as a test involving the Luhn algorithm as described above. Nevertheless, tokens generated by Tokenization Server 14 can be constrained to pass such a test in the same way initial values are constrained. That is, Tokenization Server 14 in allocating bits for a token sets aside a number of bits to form a set of check bits. The check bits are set so that the token satisfies the same constraint as the initial value. Such a constraint makes it very difficult for an unauthorized user on client 12 to distinguish between initial values and tokens.

Such a constraint, however, also makes it difficult for an authorized user of client 12 to make such a differentiation. In a conventional approach to deciding whether a datum is a token or an initial value, client 12 would send a request to Tokenization Server 14 for a lookup operation into database 16 for the token to see if there is a match. Such an approach, however, strains the load on Tokenization Server 14. Further, such an approach can also lead, for data sent over insecure lines in communications medium 20, to risks of further time and effort lost to data tampering.

Tokenization Server 14, in light of these difficulties, can enable client 12 to verify, without contacting Tokenization Server 14, whether a datum is a token or an initial value. That is, tokens produced by Tokenization Server 14 can satisfy an additional constraint that would identify a datum as a token and not an initial value. Further, an unauthorized user on client 12 should remain unable to distinguish between tokens and initial values. That is, the additional constraint takes a form that only an authorized user of client 12 would be able to evaluate. Because such tokens should satisfy the constraint satisfied by the initial value and the additional constraint, this latter additional set of constraints is a superset of the original set of constraints, although it is possible for the additional set of constraints to form a complement of the first set of constraints.

Figure 3:
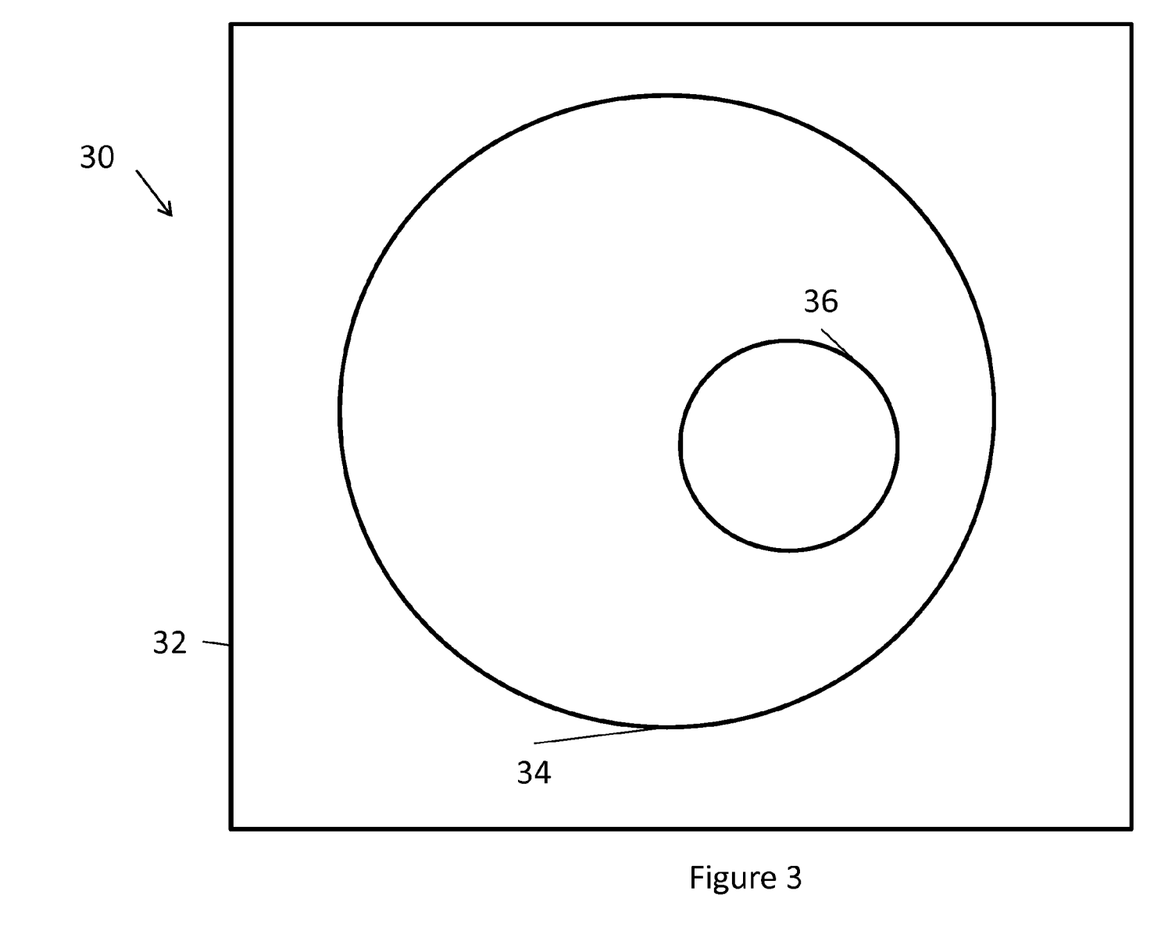
FIG. 3 is a schematic diagram of sets of constraints used in the improved technique illustrated in FIG. 1.

FIG. 3 geometrically illustrates the relationship 30 between the sets of constraints satisfied by an initial value and that satisfied by a token. Region 32 represents, for example, the set of all possible 16-digit numbers. Inside region 32 is region 36, a subset of all possible 16-digit numbers, which represents the set of valid credit card numbers, which in turn are 16-digit numbers satisfying particular standard credit card requirements, e.g., a congruent modulus requirement with respect to some prespecified number (e.g., 10) upon application of the Luhn algorithm. Containing region 36 is region 34, which represents the set of valid tokens, which is a superset of the set of valid credit card numbers. The set of valid tokens satisfies both the first set of constraints and a second set of constraints.

The problem of ensuring that only an authorized user of client 12 may be able to distinguish between tokens and initial values, without accessing Tokenization Sever 14, remains. One solution to this problem involves Tokenization Sever 14 setting aside a set of codeword bits from the bits allocated for a token. The codeword bits communicate to an authorized user of client 12 about the validity of a received token. To accomplish this, the set of codeword bits are split into a set of index bits and a set of message authentication code (MAC) bits. The values of bits in the set of index bits are defined to allow for lookups in database 16 by Tokenization Server 14. That is, the values of bits in the set of index bits are set in relation to an address of a database entry 24.

The values of the bits in the set of MAC bits are set so that only an authorized user of client 12 can determine whether a datum is a valid token, satisfying the additional set of constraints. One way to accomplish this is to set the values of the bits in the set of MAC bits according to a keyed hash function applied to the set of index bits. In order for this scheme to work, both Tokenization Server 14 and the authorized user on client 12 would possess a cryptographic key. Evaluation of the keyed hash function and therefore the values of the bits in the set of MAC bits are virtually impossible without possession of the cryptographic key.

Figure 4:
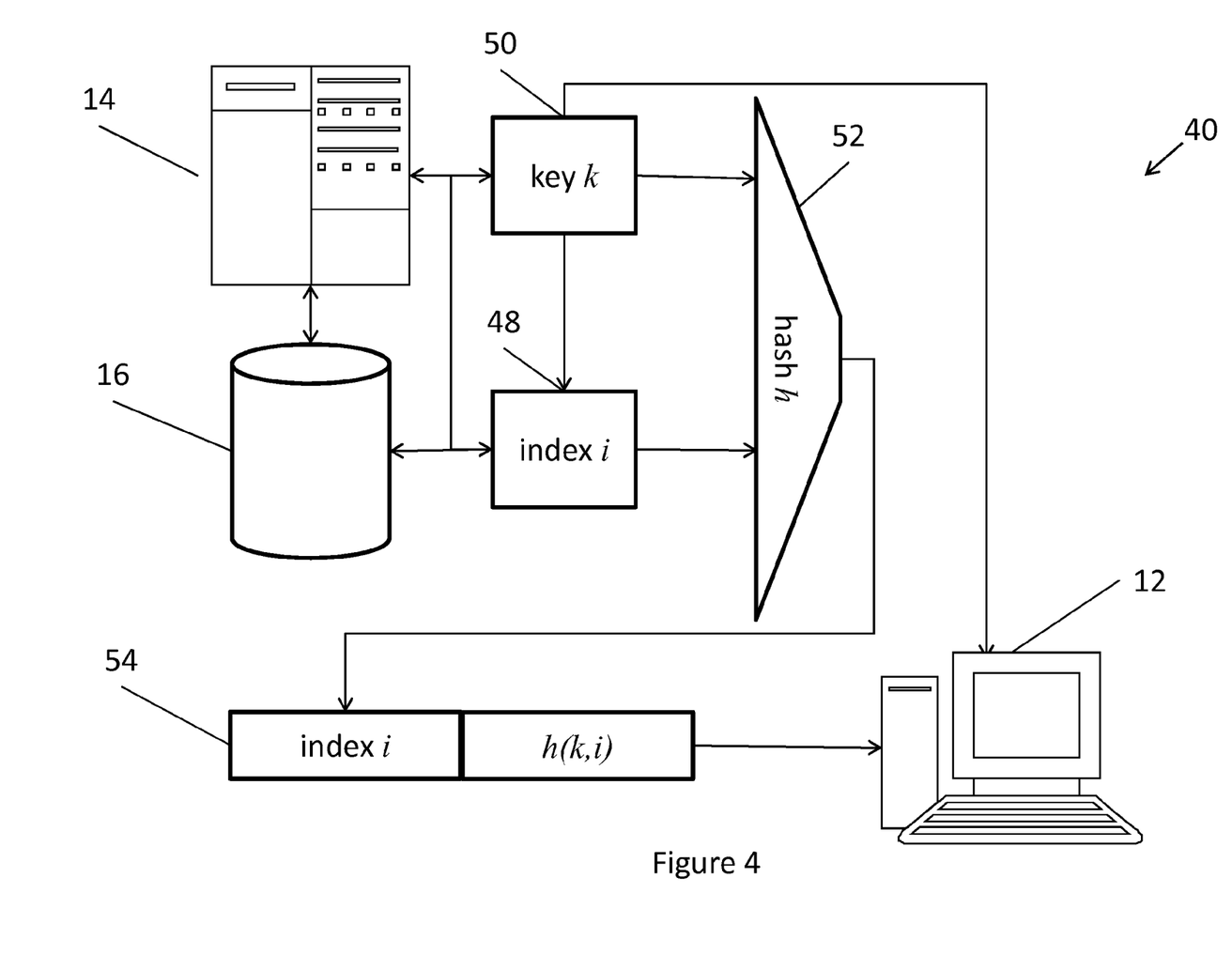
FIG. 4 is a block diagram of a cryptographic hash function used in the improved technique illustrated in FIG. 1.

FIG. 4 illustrates a system 40 in which Tokenization Server 14 enables the verification of the token by an authorized user of client 12. Tokenization Server 14, as described above, allocates a set of index bits, forming an index i, from the bits allocated for a token. The index i, for example, points to a database entry within database 16 which holds the initial value and the token from which index i was derived.

Tokenization Server 14 also produces a set of bits corresponding to a cryptographic key k. Cryptographic key k can be formed upon receipt of the tokenization request, or upon establishing a connection between client 12 and Tokenization Server 14. Tokenization Server 14 sends a copy of cryptographic key k to client 12 over a secure line within communications medium 20.

Cryptographic key k (50) and index i (48) are input into a keyed hash function h (52). The values of the bits in the set of MAC bits are set to the output of the value of the keyed hash function $h(k,i)$. An example of a keyed hash function is HMAC-SHA-256. The set of MAC bits are then concatenated with the set of index bits to form the set of codeword bits 54. The set of codeword bits 54 then make up a part the set of bits belonging to the token.

One detail that can provide an additional level of flexibility lies in the dividing of the set of codeword bits into the set of index bits and the set of MAC bits. Such a dividing can be done according to a predefined scheme known to both Tokenization Server 14 and client 12. An alternative way, however, is for Tokenization Server 14 to send, over a secure line in communications medium 20, a set of control bits that define instructions as to which bits in the set of bits in the token belong to the set of MAC bits and which belong to the set of index bits. The set of control bits can vary according to the values of the set of bits in the initial value, making it very difficult for an attacker to parse data on client 12.

Once a token is received by client 12, an authorized user possessing cryptographic key k and information pertaining as to how to extract the set of MAC bits and the set of index bits from the token can then apply the keyed hash function to the set of MAC bits. If a malicious agent were able to corrupt bits within the token being analyzed with the keyed hash function, then the result of applying the keyed hash function to the corrupted index, say i', would result in a set of MAC bits having values different from those in the received set of MAC bits. The authorized user at client 12 would then know that the token is not a valid token and contact Tokenization Server 14. The reason for this is that the design of the keyed hash function makes it very improbable that there would exist an index i' such that $h(k,i')=h(k,i)$. For the same reason, if the set of MAC bits resulting from applying the keyed hash function to index i' resulted in the same bits as in the set of MAC bits contained within the received token, then the authorized user could conclude that the token is valid.

Nevertheless, client 12 may have a need to retain some information related to each initial value to be sent to Tokenization Sever 14. For example, client 12 may need to keep the last four digits of a credit card number as part of a marketing campaign or in order to be able to contact a customer regarding a transaction. One way to satisfy this need is for Tokenization Sever 14 to allocate a number of bits to form a set of hold bits. The set of hold bits in the token could be set to be identical to corresponding bits in the initial value, e.g., the bits corresponding to the last four digits of a credit card number. More generally, the bits in the set of hold bits are defined through an external padding function which defines, e.g., the particular bits from the token that are to form the set of hold bits. The external padding function can further define a relationship between the bits in the set of hold bits and corresponding bits in the initial value. For example, all bits in the hold bits can have values set to 1, or values set equal to values of the corresponding bits in the initial value.

As an example, consider a token that must satisfy the following constraint imposed by the initial value, which takes the form of a 16 decimal digit credit card number hhhh xxxx xxxx xxxc, where hhhh indicates set of hold bits whose values are to be held fixed in the generation of the token from the initial value, x values may be any digit 0-9, and the c value is a check digit computed using the Luhn algorithm. In this example, the codeword can consume up to 11 decimal digits, or about $11 \log_2 10 \approx 37$ bits. As an example, assume that a control bit dictates a subdivision of the codeword into a 16-bit index and a 21-bit MAC, the control bit distributed in-band (i.e., within the token) to client 12. Then an attacker who lacks the key k and is trying to guess the MAC for a particular target index i' for which he has not seen the MAC can expect to succeed after $2^{20}$ trials. If the attacker's goal is to generate any valid MAC value, he can expect to succeed for some index i" after $2^{10.5}$ trials, by the Birthday Paradox. Naturally, this does not mean that Tokenization Server 14 has actually issued a token for i"; merely that a system with k cannot tell the difference without first contacting Tokenization Server 14. This online fallback makes these short MAC values tolerable.

Because of the possibility of success from an attack like a Birthday Paradox, an authorized user on client 12 may wish to contact Tokenization Server 14 as a further check on the validity of a token. For example, client 12 could send the token in question to Tokenization Server 14 over communications medium 20. Because such a check is infrequent, the sending can take place on the secure line, so that the content of the token is very unlikely to be changed by a malicious agent. Client 12 further sends, along with the token, a request to lookup the token within the database. Tokenization Server 14 then initiates the lookup operation by, e.g., splitting the set of codeword bits in the token into the set of index bits and MAC bits, and using the set of index bits to find the address corresponding to a database entry in database 16. If no database entry corresponds to the index in the token, then the token is invalid. Otherwise, if a database entry is found, then the token is valid.

Figure 5:
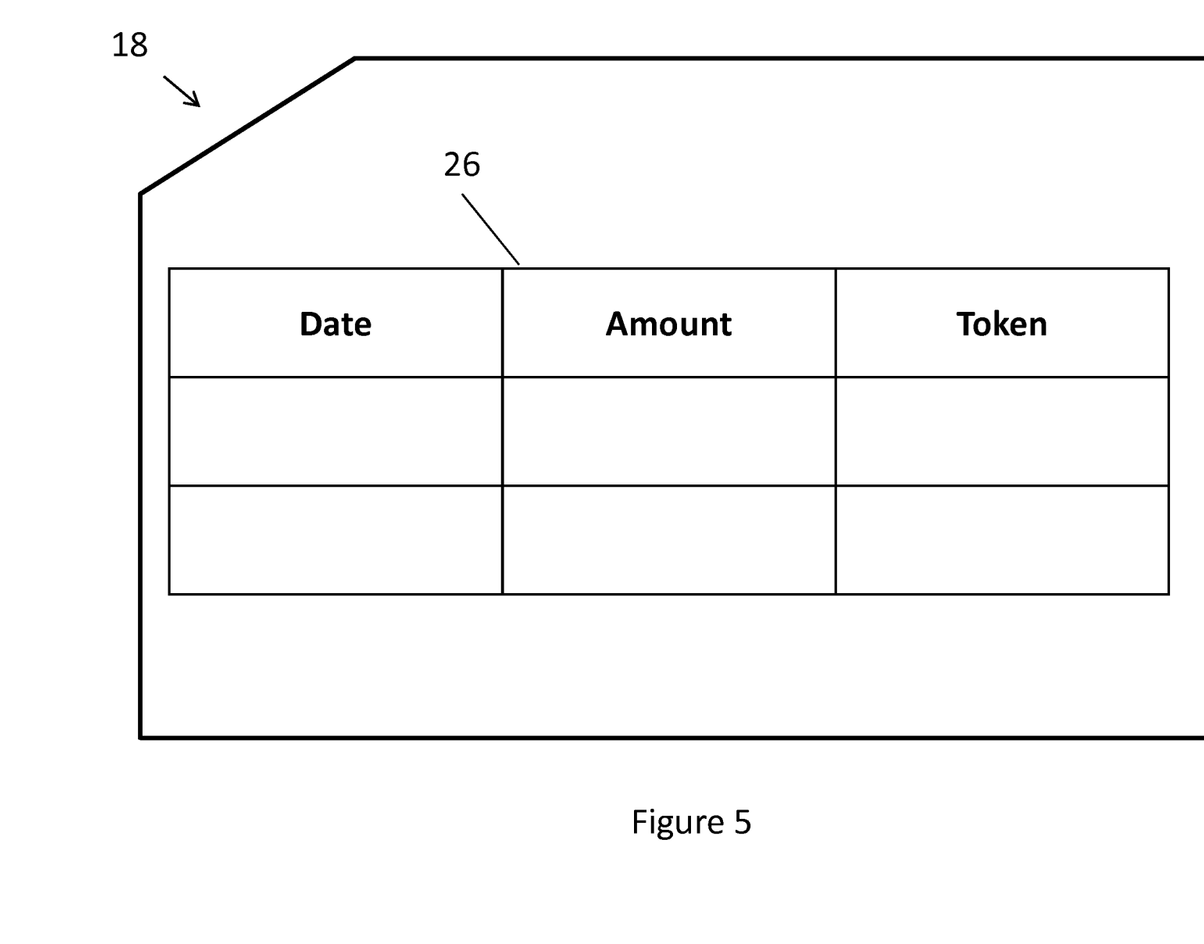
FIG. 5 is a block diagram of typical information available to a client in the electronic system of FIG. 1.

FIG. 5 illustrates token data received by client 12 and stored on a local storage medium 18. Such token data is grouped together with corresponding information, such as date/time and amount of a transaction in which a credit card number associated with the received token was used. In generating such a data grouping 26, it is helpful to have identifiers within the tokens that correspond to the original initial value as described above.

Figure 6:
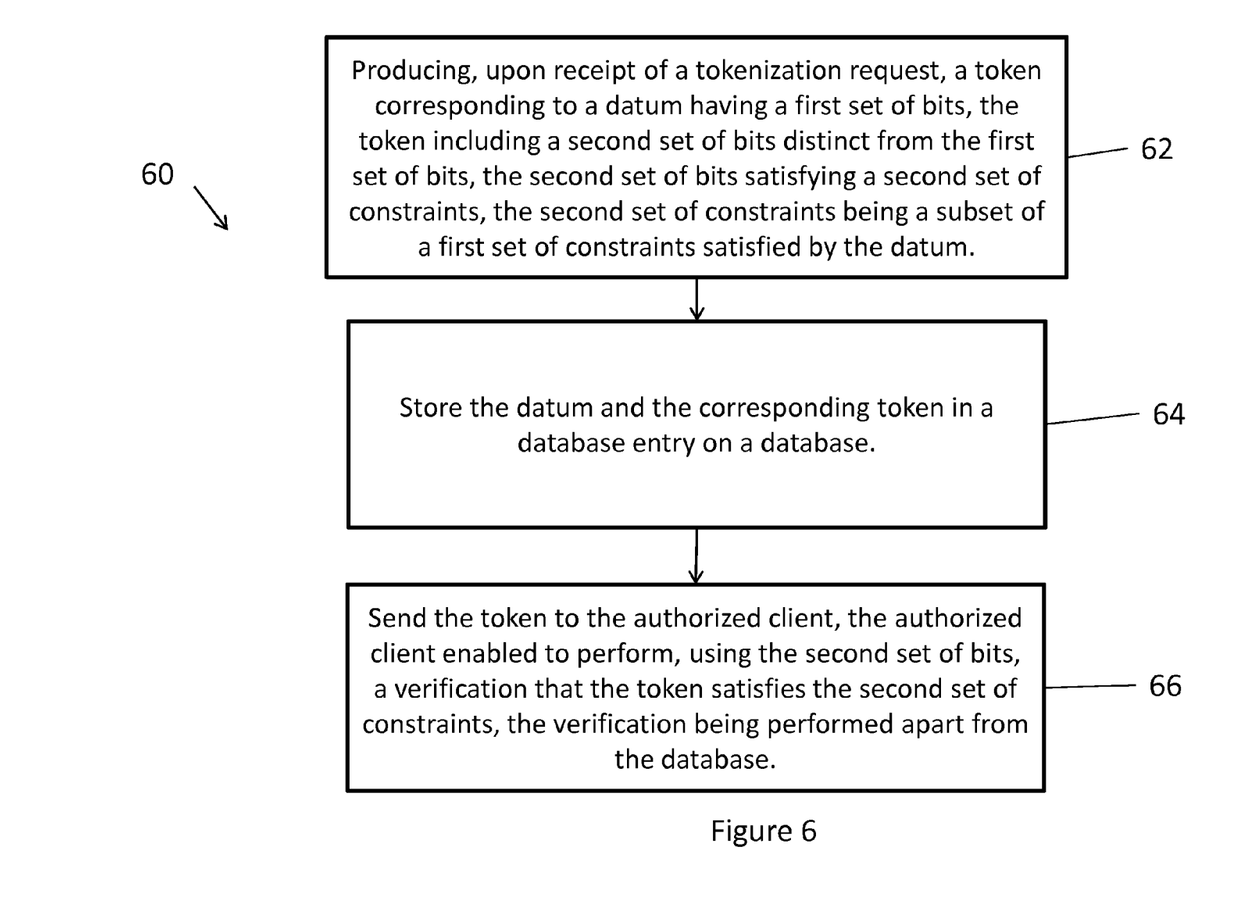
FIG. 6 is a flow chart outlining the improved technique of securing sensitive data.

FIG. 6 illustrates a method 60 of protecting a datum within a set of sensitive data as carried out in the system described above. A Tokenization Server produces 62, upon receiving a request for a token along with a datum from a set of sensitive data from an authorized client, a token. The Tokenization Server stores 64 the token and corresponding datum in a database entry on a database. The Tokenization Server then sends 66 the token to the authorized client.

The Tokenization Server produces 62 a token that satisfies a second constraint that is a superset of a first constraint satisfied by data from the set of sensitive data. The producing 62 of the token takes place upon receipt of the datum. The datum is ideally encoded using an encryption scheme and sent over a secure line with a communications medium linking the authorized client and the Tokenization Server. However, because the data in the set of sensitive data satisfy a first constraint, the encoded data can be sent over an insecure line and checked for validity.

Storage 64 of the token and the datum in a database entry by the Tokenization Server includes appending an address to the database entry. The token produced 62 by the Tokenization Server can include a reference to the address.

The sending 66 of the token to the authorized client can take place over an insecure line in the communications medium because the Tokenization Server enables the authorized client to check the validity of the token. This enablement includes sending a cryptographic key to the authorized client such that only the authorized client can differentiate between a token and a datum in the set of sensitive data.

While various embodiments of the invention have been particularly shown and described, it will be understood by those skilled in the art that various changes in form and details may be made therein without departing from the spirit and scope of the invention as defined by the appended claims.

For example, it should be understood that client 12 is a computer system having, for example, a DLP system and a POS system, the DLP system embedded within the POS system or apart. Nevertheless, client 12 can also be a server or a mobile device configured to carry out operations similar to POS and/or DLP systems.

Also, it should be understood that, as an alternative to the control bits being distributed in-band, the control bits can be determined algorithmically by client 12 according to a policy distributed out-of-band to that client, or the control bits themselves can be distributed out-of-band.

Also, it should be understood that tokens as implemented within electronic environment 20 can be used for imposing access control with respect to sensitive data. Some techniques of imposing access control policies which are suitable for use in the electronic environment 20 are described in U.S. application Ser. No. 12/826,481, filed on Jun. 29, 2010, entitled "TECHNIQUES OF IMPOSING ACCESS CONTROL POLICIES", the teachings of which are hereby incorporated by reference in their entirety.

Further, it should be understood that tokens as implemented within electronic environment 20 can be used for an automated detection of potentially sensitive data and transforming actual sensitive data to tokens. Some techniques of automated detection of defined input values and transformation to tokens which are suitable for use in the electronic environment 20 are described in U.S. application Ser. No. 12/826,491, filed on Jun. 29, 2010, entitled "AUTOMATED DETECTION OF DEFINED INPUT VALUES AND TRANSFORMATION TO TOKENS", the teachings of which are hereby incorporated by reference in their entirety.

Furthermore, it should be understood that some embodiments are directed to an electronic environment which utilizes systems that protect sensitive data. Some embodiments are directed to Tokenization Server 14. Some embodiments are directed to a system which performs protection of sensitive data. Some embodiments are directed to a process of protecting sensitive data. Also, some embodiments are directed to a computer program product which enables computer logic to perform protection of sensitive data.

In some arrangements, Tokenization Server 14 is implemented by a set of processors or other types of control/processing circuitry running software. In such arrangements, the software instructions can be delivered to Tokenization Server 14 in the form of a computer program product 70 (illustrated generally by a diskette icon 70 in FIG. 1) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A computer-implemented method of protecting a datum within a set of sensitive data, the datum including a first set of bits satisfying a first set of constraints, the set of sensitive data received at a computer from an authorized client, the computer-implemented method comprising:
   producing, by the computer upon receipt of a tokenization request, a token corresponding to the datum, the token including a second set of bits distinct from the first set of bits, the second set of bits satisfying a second set of constraints, the second set of constraints being a superset of the first set of constraints;
   storing, by the computer in a database entry on a database, the datum and the corresponding token, the database entry having an address within the database; and
   sending, by the computer, the token to the authorized client, the authorized client enabled to perform, using the second set of bits, a verification that the token satisfies the second set of constraints, the verification being performed apart from the database;
   wherein producing the token includes:
      forming a set of codeword bits;
      allocating bits from the set of codeword bits for a set of index bits and a set of message authentication code (MAC) bits;
      mapping at least a subset of the set of index bits to a pointer to the address belonging to the database entry;
      applying a keyed hash function to the set of index bits, a value of the keyed hash function specified by a cryptographic key and a set of index bits; and
      setting values of the bits in the set of MAC bits according to the value of the keyed hash function; and
   wherein allocating bits from the set of codeword bits includes:
      subdividing the set of codeword bits into a set of index bits and a set of MAC bits according to a set of control bits; and
      wherein the set of control bits varies according to values of the bits in the first set of bits; wherein the first set of constraints includes a requirement that bits of the first set of bits satisfies a first mathematical relationship; and wherein the second set of constraints includes a requirement that bits of the second set of bits satisfies the first mathematical relationship and a second mathematical relationship.

2. A computer-implemented method as in claim 1, wherein enabling the client to perform the verification that the second set of bits satisfies the second set of constraints includes:
   sending the cryptographic key to the authorized client; and
   sending the set of control bits to the authorized client.

3. A computer-implemented method as in claim 2, further comprising:
   receiving, at the computer, a suspected token from the authorized client, the suspected token having a suspected index;
   verifying, at the database, whether the suspected index points to a database entry and, if the suspected index points to a database entry, whether the token in the database entry matches the suspected token; and
   notifying the authorized client whether the suspected token is a token stored in the database.

4. A system configured to protect a datum within a set of sensitive data, the datum including a first set of bits satisfying a first set of constraints, the system comprising:
- a database;
- a network interface, and
- a processor, which, upon receiving:
  - a datum from an authorized client at the network interface, the datum being from the set of sensitive data; and
  - a tokenization request from the authorized client;
- is configured to:
  - produce a token corresponding to the datum, the token including a second set of bits distinct from the first set of bits, the second set of bits satisfying a second set of constraints, the second set of constraints being a superset of the first set of constraints;
  - store the datum and the corresponding token in a database entry on the database, the database entry having an address within the database; and
- send the token to the authorized client, the authorized client enabled to perform, using the second set of bits, a verification that the token satisfies the second set of constraints, the verification being performed apart from the database;
- wherein producing the token includes:
  - forming a set of codeword bits;
  - allocating bits from the set of codeword bits for a set of index bits and a set of message authentication code (MAC) bits;
  - mapping at least a subset of the set of index bits to a pointer to the address belonging to the database entry;
  - applying a keyed hash function to the set of index bits, a value of the keyed hash function specified by a cryptographic key and a set of index bits; and
  - setting values of the bits in the set of MAC bits according to the value of the keyed hash function; and
- wherein allocating bits from the set of codeword bits includes:
  - subdividing the set of codeword bits into a set of index bits and a set of MAC bits according to a set of control bits; and
  - wherein the set of control bits varies according to values of the bits in the first set of bits wherein the first set of constraints includes a requirement that bits of the first set of bits satisfies a first mathematical relationship; and wherein the second set of constraints includes a requirement that bits of the second set of bits satisfies the first mathematical relationship and a second mathematical relationship.

5. A system as in claim 4, enabling the client to perform the verification that the second set of bits satisfies the second set of constraints includes:
- sending the cryptographic key to the authorized client; and
- sending the set of control bits to the authorized client; and
- wherein performing the verification that the second set of bits satisfies the second set of constraints includes:
  - decomposing the second set of bits into the set of index bits and the set of MAC bits according to the set of control bits;
  - applying the keyed hash function to the set of index bits; and
  - comparing the value of the keyed hash function to the value of the set of MAC bits.

6. A system as in claim 5, wherein the processor is further configured to:
- receive, at the computer, a suspected token from the authorized client, the suspected token having a suspected index;
- verify, at the database, whether the suspected index points to a database entry and, if the suspected index points to a database entry, whether the token in the database entry matches the suspected token; and
- notify the authorized client whether the suspected token is a token stored in the database.

7. A computer program product which includes a non-transitory computer readable storage medium storing code, when executed by a computer, causes the computer, upon receiving a set of sensitive data and a tokenization request from an authorized client, to protect a datum within a set of sensitive data, the datum including a first set of bits satisfying a first set of constraints, the code including instructions to:
- produce a token corresponding to the datum, the token including a second set of bits distinct from the first set of bits, the second set of bits satisfying a second set of constraints, the second set of constraints being a superset of the first set of constraints;
- store the datum and the corresponding token in a database entry on a database, the database entry having an address within the database; and
- send the token to the authorized client, the authorized client enabled to perform, using the second set of bits, a verification that the token satisfies the second set of constraints, the verification being performed apart from the database;
- wherein producing the token includes:
  - forming a set of codeword bits;
  - allocating bits from the set of codeword bits for a set of index bits and a set of message authentication code (MAC) bits;
  - mapping at least a subset of the set of index bits to a pointer to the address belonging to the database entry;
  - applying a keyed hash function to the set of index bits, a value of the keyed hash function specified by a cryptographic key and a set of index bits; and
  - setting values of the bits in the set of MAC bits according to the value of the keyed hash function; and
- wherein allocating bits from the set of codeword bits includes:
  - subdividing the set of codeword bits into a set of index bits and a set of MAC bits according to a set of control bits; and
  - wherein the set of control bits varies according to values of the bits in the first set of bits wherein the first set of constraints includes a requirement that bits of the first set of bits satisfies a first mathematical relationship; and wherein the second set of constraints includes a requirement that bits of the second set of bits satisfies the first mathematical relationship and a second mathematical relationship.

8. A computer program product as in claim 7, wherein enabling the client to perform the verification that the second set of bits satisfies the second set of constraints includes:
- sending the cryptographic key to the authorized client; and
- sending the set of control bits to the authorized client; and
- wherein performing the verification that the second set of bits satisfies the second set of constraints includes:
  - decomposing the second set of bits into the set of index bits and the set of MAC bits according to the set of control bits;
  - applying the keyed hash function to the set of index bits; and comparing the value of the keyed hash function to the value of the set of MAC bits.

* * * * *